(12) United States Patent
Seeholzer

(10) Patent No.: US 11,717,923 B2
(45) Date of Patent: Aug. 8, 2023

(54) METHOD FOR PRODUCING A WOUND HEAT EXCHANGER

(71) Applicant: Linde GmbH, Pullach (DE)

(72) Inventor: Christoph Seeholzer, Trostberg (DE)

(73) Assignee: Linde GmbH, Pullach (DE)

( * ) Notice: Subject to any disclaimer, the term of this patent is extended or adjusted under 35 U.S.C. 154(b) by 239 days.

(21) Appl. No.: 17/287,007

(22) PCT Filed: Oct. 11, 2019

(86) PCT No.: PCT/EP2019/025342
§ 371 (c)(1),
(2) Date: Apr. 20, 2021

(87) PCT Pub. No.: WO2020/083523
PCT Pub. Date: Apr. 30, 2020

(65) Prior Publication Data
US 2021/0387296 A1    Dec. 16, 2021

(30) Foreign Application Priority Data

Oct. 23, 2018 (EP) ..................................... 18020547

(51) Int. Cl.
*B23P 15/26* (2006.01)
*F28D 7/02* (2006.01)

(52) U.S. Cl.
CPC .............. *B23P 15/26* (2013.01); *F28D 7/024* (2013.01); *F28F 2280/04* (2013.01); *Y10T 29/49364* (2015.01)

(58) Field of Classification Search
CPC .... B23P 15/26; Y10T 29/49364; F28D 7/024; F28F 2280/04
See application file for complete search history.

(56) References Cited

U.S. PATENT DOCUMENTS

| 3,703,028 | A | | 11/1972 | Bosquain et al. |
| 4,462,339 | A | * | 7/1984 | Jahnke ................. F22B 1/1892 165/163 |
| 4,771,738 | A | * | 9/1988 | Ewbank .................... F24H 1/43 122/247 |
| 10,823,508 | B2 | * | 11/2020 | Steinbauer .............. F28D 7/024 |
| 11,135,688 | B2 | * | 10/2021 | Englmeier ................ F28D 7/16 |
| 2009/0218086 | A1 | * | 9/2009 | Sciorelli ............... F28D 7/1623 165/181 |

FOREIGN PATENT DOCUMENTS

| DE | 1939564 A1 | 2/1970 |
| DE | 102016015013 A1 | 6/2018 |
| GB | 1367966 A | 9/1974 |

* cited by examiner

*Primary Examiner* — Jason L Vaughan
(74) *Attorney, Agent, or Firm* — Millen White Zelano & Branigan, PC; Brion P. Heaney

(57) ABSTRACT

The invention relates to a method for producing a wound heat exchanger which has a core tube and a tube bundle, said tube bundle having a plurality of tubes wound about the core tube in a helical manner for conducting a first fluid. The course of the tubes of the tube bundle from a first tube base of the heat exchanger to a second tube base of the heat exchanger about the core tube is automatically calculated, and at least one position at which a respective tube runs according to the calculated course is marked by means of at least one light beam, wherein the respective tube is installed according to the marking.

17 Claims, 4 Drawing Sheets

METHOD FOR PRODUCING A WOUND HEAT EXCHANGER

Figure 1:
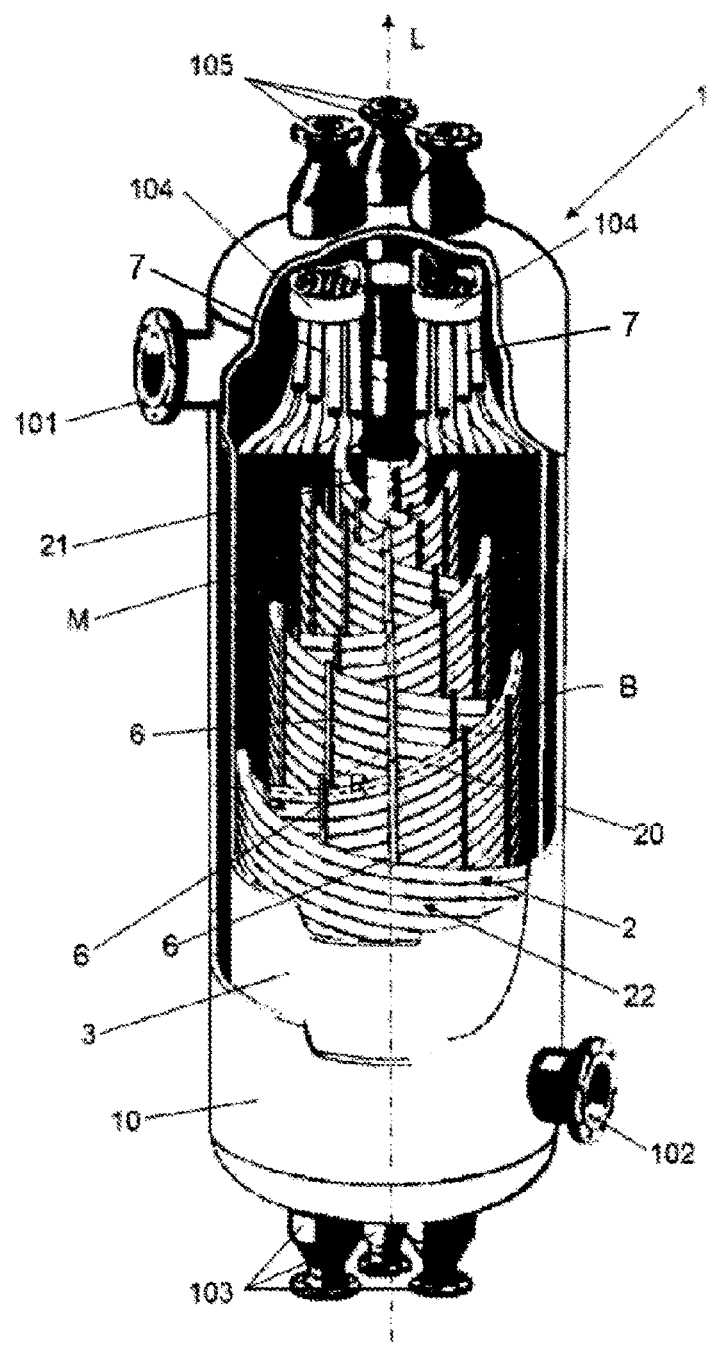

The invention relates to a method for producing a wound heat exchanger.

Such a heat exchanger has a pressure-retaining shell, which surrounds a shell space and extends along a longitudinal axis, and a core tube that runs within the shell and extends along the longitudinal axis, which—relative to a heat exchanger arranged as intended—preferably runs along the vertical during the intended operation of the heat exchanger. The heat exchanger further has a tube bundle arranged in the shell space, which has a plurality of tubes for guiding a first fluid, wherein the tubes are wound helically around the core tube, at least sectionally. The shell space is configured to receive a second fluid, such that the first fluid flowing through the tubes can exchange heat with the second fluid during operation of the heat exchanger.

During the production of wound heat exchangers, the tube bundle is first assembled, wherein the tubes are guided from the tube bottoms via a so-called braid to a winding region and are wound around the core tube in the winding region. In this case, the braid serves to feed the tubes from the particular tube bottom to the winding region, wherein the tubes are guided next to one another in the braid at least sectionally. The finished tube bundle is then introduced into the shell.

For wound heat exchangers, according to the prior art only the number of tubes, the tube allocation to the tube bottom or the cup, and the tube length in the tube bundle are set. The tube courses in the braid and the length of the tubes in the braid are only estimated; this is established by experienced winders during the production of the tube bundle.

Therefore, significantly oversize tubes must be available, that is to say, tube material is wasted, since the exact tube length in the braid is not known.

In addition, only experienced winders can be used in the production of the wound heat exchangers, or new winders have to be trained for at least 6 months.

When the tube bundle is wound, collisions between tubes also frequently occur due to winding defects, which contributes to fraying and gap formation, in particular in the edge region of the winding. In the event of an incorrect arrangement of tubes, brackets or webs, the tube bundle can also become too loose and thus become too large for the prefabricated shell. The threading of the tubes into the tube bottoms can also become very difficult and time-consuming given an incorrect distribution of the tubes.

Such errors cannot be corrected after the production of the tube bundle.

Therefore, the object of providing a method for producing a wound heat exchanger, which is improved with regard to the specified disadvantages of the prior art, arises.

Such object is achieved by the method according to claim 1. Advantageous embodiments of the method are recited in dependent claims 2 to 13 and are described below.

The invention relates to a method for producing a wound heat exchanger that has a core tube and a tube bundle, wherein the tube bundle has a plurality of tubes wound helically about the core tube for conducting a first fluid, wherein the course of the tubes of the tube bundle from a first tube bottom of the heat exchanger around the core tube to a second tube bottom of the heat exchanger is automatically calculated, and wherein in particular by means of an optical marking device such as a laser, at least one position at which a particular tube runs according to the calculated course is marked by means of at least one light beam, in particular by means of a laser beam, and wherein the particular tube is installed according to the marking.

A helical course is understood to mean a course of the particular tube which can be mathematically described in Cartesian coordinates according to the formula:

$$x(t)=(r\cos(2\pi t), r\sin(2\pi t), ht+c)$$

where t designates a parameter from the set of real numbers that designates the number of windings of the helical line passing through a coordinate origin, and wherein h denotes a pitch of the helical line, and wherein r designates a radius of the helical line, and wherein c designates a displacement of the helical line in the z-direction from the coordinate origin.

The tubes run helically, at least sectionally; that is to say, the tubes can run other than helically at individual points of the winding, for example to form gaps into which further components of the heat exchanger can be introduced.

The wound heat exchanger furthermore has a shell that surrounds a shell space for receiving a second fluid, wherein the tube bundle or the tubes are arranged in the shell space, such that heat can be exchanged between the first fluid flowing through the tubes and the second fluid located in the shell space. The core tube bears the load of the tubes.

A tube bottom is to be understood in particular as a component that realizes a branching between a supply line or discharge line and a plurality of tubes of the tube bundle in such a way that the one stream of the first fluid provided via the feed line is divided at the tube bottom into a plurality of partial flows which flow through the tubes, or in such a way that the partial flows can be recombined at a further tube bottom connected to the discharge line and removed from the heat exchanger via the discharge line. The tube bottoms have holes into which the tubes are inserted during assembly.

A plurality of tubes for guiding the first fluid connected to a common tube bottom is designated a tube group. A wound heat exchanger in accordance with this invention can include one or more tube groups. In the case of a plurality of tube groups, in particular different fluid media in the particular tube groups can be guided in parallel through the heat exchanger.

Said tube bottoms can be positioned differently in the heat exchanger. For example, the tube bottoms can be arranged on the front side, i.e., parallel to a plane perpendicular to the longitudinal axis. Alternatively, the tube bottoms can, for example, also be arranged parallel to the longitudinal axis (i.e., radially or tangentially with respect to the longitudinal axis).

Installing the tube comprises in particular the insertion of the tube into a particular hole of the first and/or second tube bottom, the helical winding of the tube around the core tube, and the guiding of the tube in a first or second braid between the particular tube bottom and the winding region.

When the tubes are wound, a plurality of tube layers are successively formed, each of which extends in the circumferential direction with respect to the longitudinal axis. In so doing, each layer has a plurality of tubes which (at least sectionally) run around the core tube in the form of a multiple helix. In so doing, tubes of different tube groups can also be present within a tube layer. However, it is also conceivable for a tube layer to have only one tube that runs (at least sectionally) in a single helix around the core tube.

Adjacent windings (of the same tube or different tubes) of the helically wound region of the tube bundle can be connected to one another, in particular welded, by means of brackets, in order to fix them, in particular in the axial direction with respect to the longitudinal axis.

The innermost tube layer can contact the core tube or at least one web connected to the core tube. The further tube layers lying thereabove either directly contact each of the adjacent tube layers, or the tube layers contact corresponding webs that are arranged between the particular tube layers of the tubes, and each form a distance between the tube layers in the radial direction with respect to the longitudinal axis.

The course of the tube is calculated in particular by using geometric formulas. Three-dimensional computer-aided design (3D CAD) can be used in particular.

For example, on the basis of the geometric calculation, the course of the tubes in the braid between the tube bottom and winding region can be optimized in such a way that the space is optimally utilized (compact braid construction) and no collisions occur between the tubes; that is to say, no tube is in the way of the other tube while being run or wound.

The course of the tubes in the winding region can also be optimized in such a way that the tube layers of the tubes are as gap-free as possible, and no collisions occur between the tubes.

By means of the calculated geometry and the corresponding display of the tube course at the assembly site, optimized tube lengths can be achieved and the production time can be significantly reduced.

In addition, fraying and the formation of gaps, in particular in the edge region of the winding, can be largely prevented by means of the method according to the invention.

The calculated profile of the tubes is optimized in particular in such a way that the heat transfer capacity of the heat exchanger is as great as possible, and/or that the tube has a defined overall length.

By marking the tube course by means of at least one light beam according to the invention, the calculated optimized course of the tubes can be precisely displayed to the fitter of the tube bundle directly at the assembly site, without the latter being able to access additional tools.

As a result, the error rate during the assembly of the tube bundle can be reduced, and the quality of the wound heat exchangers can be correspondingly increased. Moreover, training times for workers can be reduced, and the production time can be significantly reduced.

According to one embodiment, a particular hole of the first tube bottom or the second tube bottom is marked by means of the at least one light beam, wherein the particular tube is inserted into the particular marked hole during assembly.

In this case, the fitter is shown the position directly on the tube bottom into which he must insert the tube. Faulty tube assignments can thereby be avoided.

According to a further embodiment, the tubes are guided from the first tube bottom in a first braid to a winding region of the tube bundle, and are guided from the winding region in a second braid to the second tube bottom, wherein the tubes in the winding region are wound around the core tube in a plurality of windings.

According to a further embodiment, a particular first position at the transition between the first braid and the winding region is marked by means of at least one light beam, wherein a particular tube runs at the first position according to the calculated course, and wherein a second position at the transition between the winding region and the second braid is marked by means of at least one light beam, wherein the particular tube runs at the second position according to the calculated course, and wherein the particular tube is helically wound around the core tube from the marked first position to the marked second position.

That is, the beginning and the end of the winding region are optically marked by means of the at least one light beam. In particular, this allows the winding of the tubes around the core tube to be started at the correct calculated position.

According to a further embodiment, the course of at least one web between two tube layers each of the tubes of the heat exchanger is automatically calculated, such that a distance between the particular tube layers running in the radial direction with respect to the longitudinal axis is formed by means of the at least one web, and wherein the calculated profile of the at least one web is marked by means of the light beam, and wherein the web is mounted according to the marking.

This therefore shows the fitter directly on the tube bundle the position at which the webs have to be placed on the particular tube layer and, if necessary, welded thereto.

The at least one web runs in particular parallel to the longitudinal axis of the heat exchanger.

The webs are fastened, in particular by adhesive welding, to the underlying tube layer of the tubes.

According to a further embodiment, the calculated course of an edge of a particular web is marked on a particular tube layer by means of a light beam, and wherein the particular web is positioned on the particular tube layer in such a way that the edge runs along the light beam.

According to a further embodiment, the at least one web in each case has at least one identification feature selected on the basis of the calculated profile, wherein the identification feature characterizes a position of the particular web and/or a position of at least one tube of the tube bundle in the heat exchanger, wherein the particular web and/or the at least one tube is or are mounted according to the identification feature.

According to another embodiment, the tubes of the tube bundle also have an identification feature. In this case, the identification feature comprises in particular an identification number, wherein in particular the tubes are mounted in the tube bundle in an order of their particular identification number.

The identification feature can be introduced into the web or the tube for example by stamping, printing or engraving (for example NC engraving).

By means of the identification feature according to the invention, the tube bundle fitters can be easily provided with an orientation for assembling the tubes, webs and possibly clamps in a simple manner, such that the automatically calculated optimized arrangement of the tubes and webs can be realized.

As a result, worker training times can be reduced, and the production time can be significantly reduced.

This is the case even if the at least one light beam according to the invention is blocked, for example by the fitter or a tool, such that the components can no longer be marked by the light beam.

The individual components of the tube bundle can likewise be individualized by an identification number, such that each component can be placed at the position that provides the calculated arrangement of the tube bundle.

According to a further embodiment, the identification feature comprises an identification number, wherein in particular the at least one web is mounted or installed in an order corresponding to the particular identification number in the heat exchanger.

According to a further embodiment, the at least one web is mounted parallel to a longitudinal axis of the heat exchanger along which the core tube extends, and wherein the identification feature of a particular web comprises an angular position of the particular web, wherein the angular position indicates a position of the particular web in the circumferential direction relative to the longitudinal axis proceeding from a reference angular position designated as an angular position of 0°.

This is advantageous in particular if the webs have different markings for the positioning of the tubes of the next tube layer, depending on the position. In this case, the correct component can in each case be selected by the identification feature and installed at the specific position.

According to another embodiment, the identification feature of a particular web comprises an indication of a tube layer of the tubes of the tube bundle on which the particular web is to be positioned in the heat exchanger during assembly.

In this case, the tube layers can be consecutively numbered from the core tube outward, for example. In this way, the desired radial position (with respect to the longitudinal axis) of the particular web in the tube bundle can be determined.

According to a further embodiment, the identification feature comprises a first marking that marks a first position and/or a second position, wherein at the first position, the first braid merges into the winding region according to the calculated course, and wherein at the second position, the winding region transitions into the second braid according to the calculated course.

In particular, the webs can thereby be positioned correctly in the axial direction (parallel to the longitudinal axis) corresponding to the calculated arrangement.

According to another embodiment, the at least one identification feature of the web comprises a first marking that marks an end of the winding region.

In particular, the at least one identification feature has a first marking that marks a first end of the winding region, and the at least one identification feature has a first marking that marks a second end of the winding region.

Furthermore, the at least one identification feature can also have a first marking that marks the center of the winding region. In this case, the center of the section is to be understood as the position that has the same distance along the longitudinal extension direction of the web from the ends of the winding region.

According to a further embodiment, the identification feature comprises a plurality of second markings, wherein the tubes are wound around the core tube in such a way that a particular winding of the tube runs at the position of a particular second marking.

This easily provides the winder of the tubes with an orientation for the arrangement of the tubes of the tube layer lying above the particular web. In this case, the markings can mark the course of a guide tube, for example, on which the further tubes of the particular tube layer are aligned in subsequent steps.

According to a further embodiment, the second markings are each extended along a line, wherein a particular tube is wound around the core tube in such a way that the particular tube runs in sections along the particular line.

According to a further embodiment, at least a part of the heat exchanger or tube bundle is optically detected (for example with at least one camera), wherein the position of the heat exchanger is determined by means of the optical detection, and wherein the at least one light beam is aligned on the basis of the determined position, in order to mark the components of the tube bundle.

That is, the optical marking device is adjusted in particular by the optical detection of the heat exchanger.

The position of the heat exchanger is to be understood as the three-dimensional position of the center of gravity of the heat exchanger and the orientation of the heat exchanger along three coordinates (e.g., rotation about the longitudinal axis and rotation/tilting about two axes perpendicular to the longitudinal axis).

According to another embodiment, the at least one identification feature of the particular tube and/or web to be assembled is displayed by means of an optical display device.

This means that, for example, an identification number of the corresponding component is first displayed by the display device in each assembling step, such that the fitter can select the corresponding component and then mount it.

According to another embodiment, a course of a tube of a particular tube bundle of the heat exchanger is automatically calculated from a first tube bottom of the heat exchanger around the core tube to a second tube bottom of the heat exchanger, wherein the calculated course of the tube is displayed by means of a first display device, and wherein the tube is mounted in the heat exchanger corresponding to the indicated course, and wherein the at least one identification feature of the particular tube and/or web to be installed is displayed by means of the first display device.

According to a further embodiment, the at least one identification feature of the tube or web comprises at least one third marking, wherein the third marking indicates a position at which a clamp for fastening the tube to an adjacent tube of the particular tube bundle is to be positioned, wherein the clamp is positioned at the marked position.

According to another embodiment, the at least one identification feature of the tube comprises at least one fourth marking, wherein the fourth marking indicates a cutting position at which the tube is to be cut, wherein the tube is cut at the cutting position.

Further details and advantages of the invention are to be explained by the following description of figures of exemplary embodiments with reference to the figures.

Figure 2:
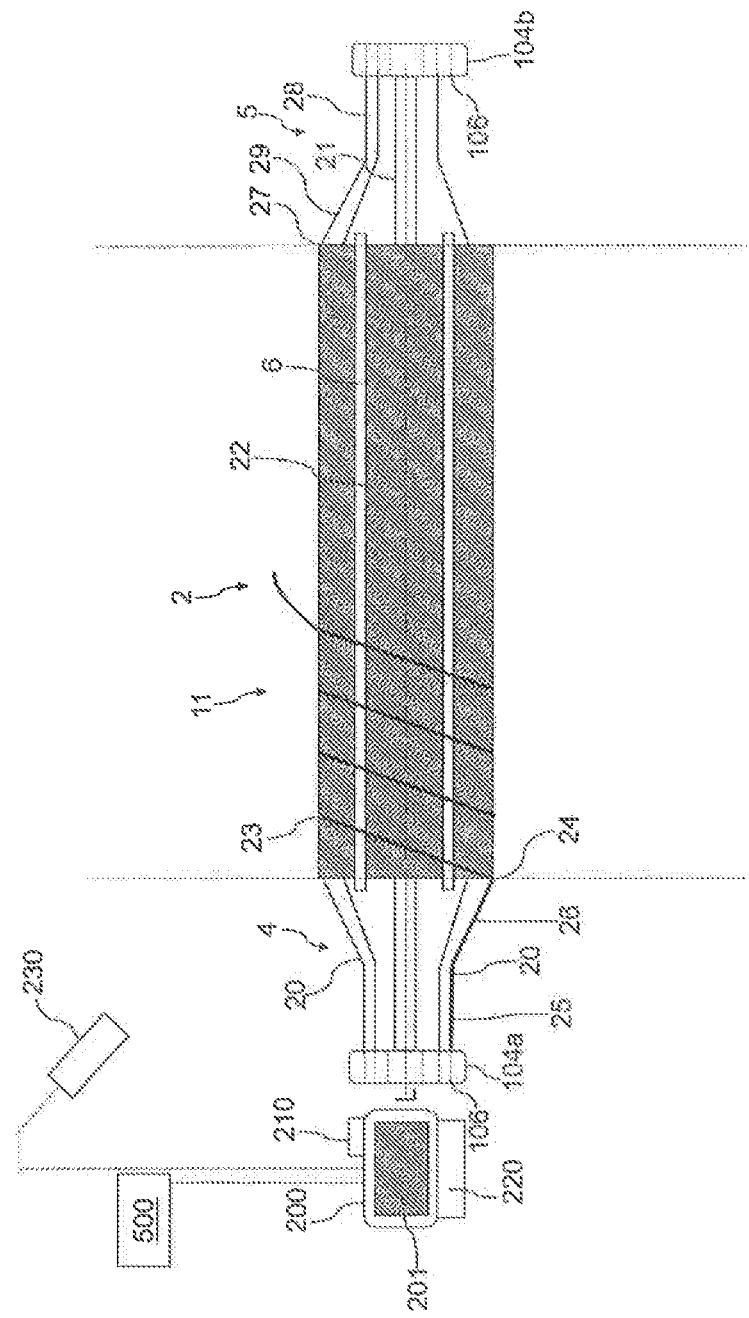
Figure 3:
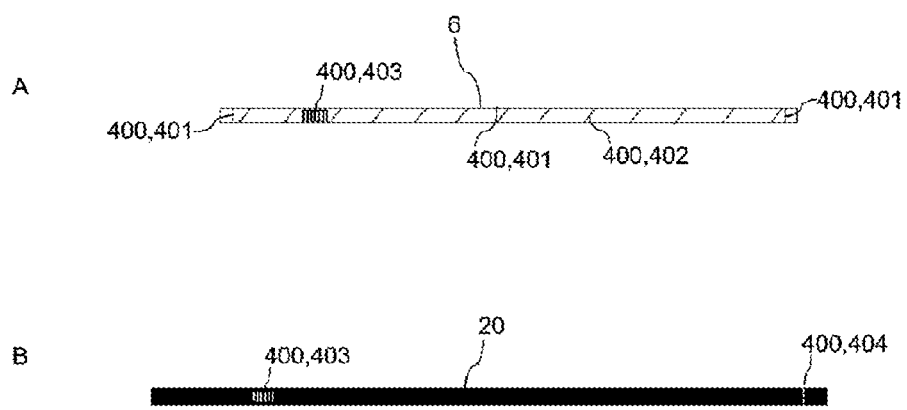
Figure 4:
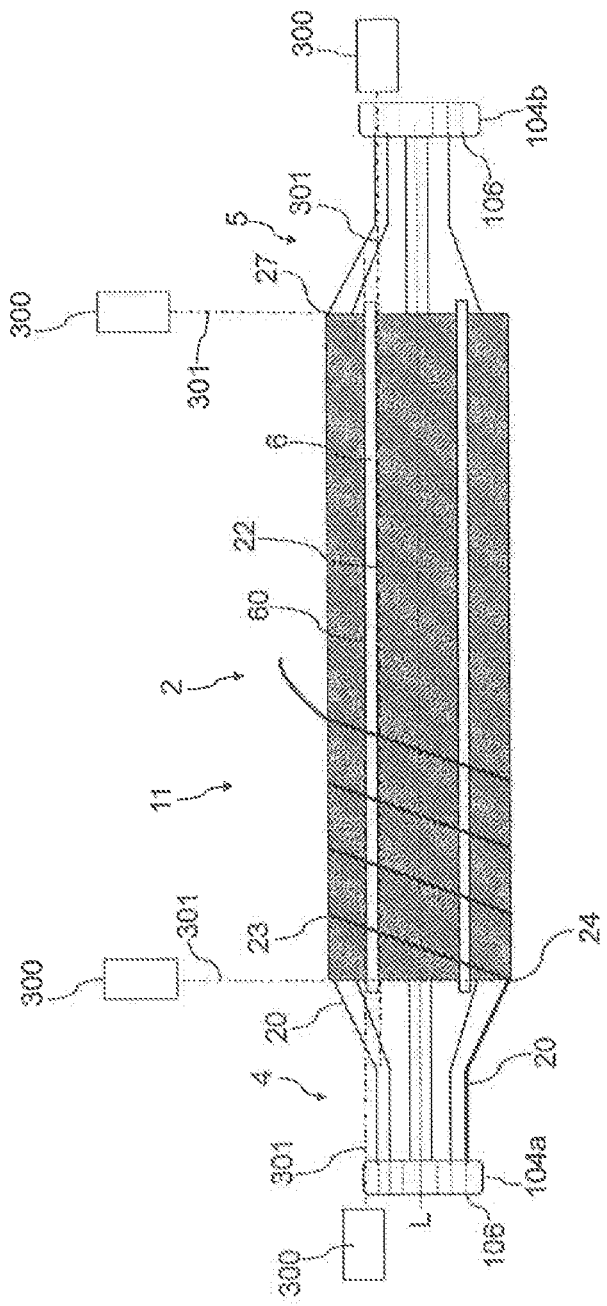

The following are shown:

FIG. 1 a partially sectional view of a wound heat exchanger;

FIG. 2 a schematic representation of a tube bundle of a wound heat exchanger during production using the method according to the invention, FIG. 3 a schematic representation of a tube and a web for a wound heat exchanger, FIG. 4 a schematic representation of a tube bundle of a wound heat exchanger during production using the optical marking method according to the invention.

FIG. 1 shows a wound heat exchanger 1 that has a tube bundle 2 with a plurality of tubes 20, wherein the tubes 20 run along a longitudinal axis L of the heat exchanger 1 and are helically wound around a core tube 21 or onto the core tube 21 so as to run along an imaginary helical path B indicated in FIG. 1.

In particular, the heat exchanger 1 according to the invention according to FIG. 1 has said core tube 21 onto which the tubes 20 of the tube bundle 2 are wound, such that the core tube 21 bears the load of the tubes 20. However, the invention is also in principle applicable to wound heat exchangers 1 without a core tube 21 in which the tubes 20 are wound helically around the longitudinal axis L.

The heat exchanger 1 is designed for indirect heat exchange between a first and a second fluid and has a shell 10 that surrounds a shell space M for receiving the second fluid which can for example be introduced into the shell space M via an inlet connection 101 in the shell 10 and, for example, can be removed from the shell space M again via a corresponding outlet connection 102 in the shell 10. The shell 10 extends along said longitudinal axis L, which preferably runs along the vertical relative to a heat exchanger 1 arranged as intended. Furthermore, the tube bundle 2 with a plurality of tubes 20 for conducting the first fluid is arranged in the shell space M. Such tubes 20 are wound helically on the core tube 21 in a plurality of tube layers 22, wherein the core tube 21 likewise also extends along the longitudinal axis L and is arranged concentrically in the shell space M.

A plurality of tubes 20 of the tube bundle 2 can each form a tube group 7 (three such tube groups 7 are shown in FIG. 1), wherein the tubes 20 of a tube group 7 can be combined in an associated tube bottom 104, wherein the first fluid can be introduced into the tubes 20 of the particular tube group 7 via inlet connections 103 in the shell 10 and removed from the tubes 20 of the corresponding tube group 7 via outlet connections 105.

Heat can thus be transferred indirectly between the two fluids. The shell 10 and the core tube 21 can furthermore be cylindrical at least in sections, such that the longitudinal axis L forms a cylinder axis of the shell 10 and of the core tube 21 running concentrically therein. Furthermore, a skirt 3 which encloses the tube bundle 2 or the tubes 20 can be arranged in the shell space M, such that a gap surrounding the tube bundle 2 or the tubes 20 is formed between the tube bundle 2 and said skirt 3. The skirt 3 serves where appropriate to suppress, as far as possible, a bypass flow past the tube bundle 2 of the second fluid fed to the tubes 20 and conducted in the shell space M. The second fluid is therefore conducted in the shell space M preferably in the region of the shell space M surrounded by the skirt 3. Furthermore, the individual tube layers 22 can be supported on one another or on the core tube 21 (in particular when the tube bundle 2 is mounted horizontally) via webs 6 (also referred to as spacer elements) extending along the longitudinal axis L.

FIG. 2 shows a tube bundle 2 of a wound heat exchanger 1 (for example as shown in FIG. 1) during assembly according to the invention in a longitudinal section with respect to the longitudinal axis L. In this case, the longitudinal axis L is arranged in particular horizontally (in contrast to the intended operation of the heat exchanger 1 in which the longitudinal axis L runs in particular vertically).

The heat exchanger 1 shown here has only a first tube bottom 104a and a second tube bottom 104b, along with a tube bundle 2 that extends between the first tube bottom 104a and the second tube bottom 104b and is formed from a plurality of tubes 20. That is, the tubes 20 of the tube bundle 2 are combined in this case into a single tube group extending between the first tube bottom 104a and the second tube bottom 104b. Of course, however, the production method according to the invention can also be applied to wound heat exchangers 1 having a plurality of tube groups, and correspondingly to a plurality of first and second tube bottoms 104a, 104b (such as for example the heat exchanger 1 with three tube groups shown in FIG. 1).

The tube bundle 2 has a first braid 4 adjacent to the first tube bottom 104a, a winding region 11 adjacent to the first braid 4 along the longitudinal axis L and a second braid 5 adjacent to the winding region 11 along the longitudinal axis L. In the first braid 4, a first section 25 of the tubes 20 of the tube bundle 2 runs parallel to the longitudinal axis L, whereas a second section 26 that adjoins the first section 25 at a bend runs angled to the longitudinal axis L (in particular to the outside) to a first position 24 at which the winding region 11 begins.

In the winding region 11, the tubes 20 are wound helically around the core tube 21 extending along the longitudinal axis L in a plurality of tube layers 22 in a plurality of windings 23. In FIG. 2, a tube 20 that is being wound around the core tube 21 during assembly of the tube bundle 2 is emphasized by way of example. The emphasized tube 20 can be, for example, a so-called guide tube, that is to say, the first wound tube 20 of a particular tube layer 22. In particular, the further tubes 20 of the particular tube layer 22 can then be aligned on such a guide tube. In so doing, the further tubes 20 are fixed to the adjacent tubes 20 or windings 23, in particular by means of clamps.

A fourth section 29 of the tubes 20 continues to run at an angle, in particular inwards, from a second position 27 at which the winding region 11 adjoins the second braid 5 and, at a particular bend, adjoins a particular third section 28, which in turn runs parallel to the longitudinal axis L toward the second tube bottom 104b.

Furthermore, two webs 6 running parallel to the longitudinal axis L are shown, which are fastened, for example by adhesive welding, to an already finished tube layer 22 of the winding region 11. Such webs 6 serve as spacers (in the radial direction with respect to the longitudinal axis) between the adjacent tube layers 22 in the finished tube bundle 2. The distances between the tube layers 22 formed by the webs 6 allow a better distribution of the second fluid provided in the shell space M between the tube layers 22, such that a more effective heat exchange between the second fluid and the first fluid conducted in the tubes 20 can take place. Naturally, further webs 6 not shown here may be present.

FIG. 2 also shows a display device 200 in the form of a terminal with a screen 201 for visually displaying information, a communication device 210 for, in particular, wireless data exchange with a receiver device, and an input device 220 for inputting data into the display device 200.

An electronic data processing unit 500 such as a computer is also shown, wherein the data processing unit 500 is designed to automatically calculate the course of the tubes 20 of the tube bundle 2 from the first tube bottom around the core tube 21 to a second tube bottom 104b of the heat exchanger. This is done, in particular, using CAD software (running on the data processing unit 500) by means of geometric formulas. Furthermore, the data processing unit 500 can be designed to automatically calculate the arrangement of at least one web 6 in or on the tube bundle 2 and/or the arrangement of at least one clamp for fixing adjacent tubes 20 of a tube layer 22 of the tube bundle 2. The data processing unit 500 is connected to the display device 200 via a data line, such that the course of the tubes 20 calculated by means of the data processing unit 50, or the calculated arrangement of the webs 6 and/or clamps, can be transmitted to the display device 200 in the form of data. Alternatively, a course of the tubes 20 previously calculated by means of the data processing unit 50, or a previously calculated arrangement of the webs 6 and/or clamps can also be stored in a memory of the display device 200.

For example, a graphical representation of the course of the tubes 20, along with the arrangement of the webs and/or of the clamps determined using the automatically calculated course or the automatically calculated arrangement, can then be displayed on the screen 201 by means of the display device 200, such that a fitter of the tube bundle 2 can mount the specified components using the graphical representation.

In so doing, for example a particular hole 106 in the first tube bottom 104*a* can first be highlighted on the graphical representation on the screen 201, such that the fitter can introduce a particular tube 20 into the particular hole 106. Then, for example, the course of the particular tube 20 in the region of the first braid 4, the winding region 11 and the second braid 5 can be graphically highlighted, such that the fitter can mount the particular tube 20 corresponding to the displayed course (in particular wind around the core tube 21 in the winding region 11). Finally, a particular hole 106 of the second tube bottom 104*b* can be graphically represented, such that the fitter can introduce the particular tube 20 into this hole 106.

Then, for example analogous to the described method, the course of further tubes 20 of the same tube layer 22 can be graphically represented, such that the fitter can mount them. In so doing, the position of a clamp for fixing two adjacent tubes 20 of the tube layer 22 can also be indicated as needed by means of the display device 200. After a particular tube layer 22 has been completely mounted, the positions of the webs 6 that are to be mounted on the particular tube layer 22 can also be indicated by the display device 200, such that the fitter can appropriately position them and, if necessary, weld them to the underlying tube layer 22 or to the clamps.

Optionally, the fitter can confirm the completion of a partial step of mounting by means of the input device 220. The display device 200 can then (by means of a corresponding control unit that detects the input signal and sends a corresponding control command) display the graphical representation that corresponds to the next mounting step (for example the course of the tube 20 in the region of the second braid 5 after completion of the winding of the tube in the winding region 11).

In addition, the display device 200 can display, for example, an identification feature (e.g., an identification number) of a tube 20, web 6 or a clamp to be mounted, such that the fitter can select a tube 20 equipped with the identification feature, a corresponding web 6 or a clamp for mounting. This is advantageous, for example, if a tube 20 of a specific length, which is provided with the identification feature in accordance with its length, is to be installed at a specific position of the tube bundle 2.

The display device 200 is furthermore connected via a data connection to an optical detection device 230 (for example a camera). An image of at least a part of the tube bundle 2 can be recorded by means of the optical detection device 230 and transmitted to the display device 200 in the form of data via the data connection. Such an image can be evaluated, for example, by a processor of the display device 200 using appropriate software for error analysis. Alternatively, it is possible to transmit the image via the communication device 210, for example, to a specialist who is located distant from the location for mounting the tube bundle 2, such that he can optionally analyze mounting errors.

Furthermore at the location for mounting the tube bundle 2, a fitter can communicate via the display device 200 and the communication device 210 with a corresponding specialist who is located distant from the location for mounting the tube bundle 2, in order to discuss, for example, mounting errors or to obtain help from the specialist. Such communication can, for example, be in the form of a video conference.

FIG. 3A shows a schematic representation of a web 6, for example an elongated sheet metal strip, which is suitable as a spacer element between two superimposed tube layers 22 of a tube bundle 2 of a wound heat exchanger 1 (see FIGS. 1 and 2).

The web 6 has a plurality of identification features 400. These comprise three first markings 401 in the form of marking lines (e.g., printed on the web 6 or engraved in the web 6). Such marking lines run in particular perpendicular to the longitudinal extension direction of the web 6. When mounting the web 6, the exterior two marking lines are to be arranged on a particular tube layer 22 of the tube bundle in such a way that the marking lines lie at the ends of the winding region 11, at which the winding region 11 merges into the first braid 4 and the second braid 5. That is to say, the particular exterior first markings 401 are located at a first position 24 and at a second position 27 (see FIG. 2), wherein at the first position 24, the first braid 4 merges into the winding region 11 according to the calculated course, and wherein at the second position 27, the winding region 11 merges into the second braid 5 according to the calculated course.

The first markings 401 make it possible for the fitter of the tube bundle 2 to in particular easily position the webs 6 in the desired (calculated) axial position (with respect to the longitudinal axis L) on the particular tube layer 22. The optional additional first marking 401 marks, for example, the center of the tube bundle 2 between the braids 4, 5 on the web 6.

The web 6 shown in FIG. 3A also has a plurality of second markings 402, which are configured as marking lines (also for example printed or engraved) running obliquely with respect to the longitudinal extension direction of the web 6. Such second markings 402 mark the course of a particular tube 20 of the next tube layer 22 to be wound (for example the course of a guide tube). The tubes 20 run in particular in sections along the marking lines. A particular second marking 402 marks in particular the course of a particular winding 23 of a tube 20. The second markings 402 can mark the course of a single tube 20 (for example of the guide tube), or the course of a plurality of tubes 20 of the tube layer 22 to be wound.

By means of the second markings 402 on the webs 6, an orientation for winding the tubes 20 can be provided for the winder of the tubes 20 in a simple manner and in particular without further technical tools, according to the previously calculated course.

Furthermore, the web 6 shown in FIG. 3A has a third marking 403. Such third marking 403 can comprise, for example, an identification number and an indication of the tube layer 22 on which the web 6 is to be arranged, and/or an indication of an angular position of the web 6 (in the circumferential direction with respect to the longitudinal axis L). The third marking 403 can be, for example, printed or engraved text, or a printed, scannable barcode.

The webs 6 according to the present invention may differ from one another depending on the desired (calculated) position of the particular web 6 in the tube bundle 2, in particular by second markings 402 (marking lines for the tube course of the next layer to be wound) attached at different positions. It is therefore advantageous to provide the webs with an identification number or a third marking 403, which allows a specific web to be selected and installed in the tube bundle 2 at the calculated position. For example, an indication of the tube layer 22 on which the web 6 is to be positioned determines the radial position of the web, while the indication of the angular position determines the position in the circumferential direction with respect to the longitudinal axis L.

FIG. 3B shows a schematic representation of a tube 20 for installation in a tube bundle 2 of a wound heat exchanger 1 (see FIGS. 1 and 2). The tube has two identification features 400, namely a third marking 403 and a fourth marking 404. As in the case of the web 6 described above, the third marking 403 is, for example, an identification number or an indication of the position or orientation of the tube 20 in the tube bundle 2.

The fourth marking 404 is a cutting marking, for example in the form of a printed or engraved marking line, which marks a position at which the tube 20 is to be cut, in particular after being wound around the core tube 21 in the winding region 11 and before introducing an end of the tube 20 (produced by cutting) into a corresponding hole 106 in the second tube bottom 104b.

By means of such a cutting marking, in particular longer tubes 20 can be provided, which, during assembly, are shortened to the optimized tube length determined by means of the automatic calculation. The described fourth marking 404 allows the cutting position for the fitter of the tube bundle 2 to be marked in a simple manner.

According to a further embodiment, at least one clamp is provided for connecting adjacent tubes of a tube layer, wherein the at least one clamp has one identification feature each.

Analogously to FIG. 2, FIG. 4 shows a schematic representation of a tube bundle 2 of a wound heat exchanger 1 in a longitudinal section with respect to the longitudinal axis L.

In addition, four optical marking units 300, for example laser sources, are shown in FIG. 4, each of which emits a light beam 301, for example a laser beam, which in each case optically marks components of the tube bundle 2.

Two of the optical marking units 300 are arranged in each case such that the particular light beam 301 runs parallel to the longitudinal axis L. As a result, in particular as shown in FIG. 4, the course of an edge 60 of a web 6 can be marked on the surface of the particular tube layer 22 (at the shown point in time of the production process). The particular light beam 301 therefore indicates to the fitter the desired angular position (based on the automatic calculation) of the particular web 6 in the circumferential direction with respect to the longitudinal axis L. The fitter can therefore place the particular web on the tube layer 22, orient the edge 60 (or edges in the event that light beams 301 are on both edges) to the light beam 301 and in particular weld the web 6 to the underlying tube layer 6 or to underlying clamps.

Two further optical marking devices 300 are arranged in such a way that the particular light beams 301 emitted by such marking devices 300 run perpendicular to the longitudinal axis L. In this case, such light beams 301 in particular mark the first position 24 described above at which the first braid 4 merges into the winding region 11, and the second position 27 at which the winding region 11 merges into the second braid 5.

By means of such markings, it is therefore possible to indicate the location on the tube bundle 2 at which a particular tube 20 of the tube bundle 2 to be mounted (for example the tube 20 highlighted in FIG. 4) is to begin its winding around the core tube 21.

This allows the fitter to easily and precisely implement the previously automatically calculated optimized tube shape.

The use of the optical marking means 300 is of course not limited to indicating the web edges 60 along with the beginning and end of the winding. Furthermore, for example, the course of a particular tube 20 in the winding region 11 can also be optically marked by means of the light beams 301. It is moreover conceivable to indicate the desired (calculated) position of clamps, which each fix adjacent tubes 20 of a tube layer 22 by means of a light beam 301.

The optical marking devices 300 may of course have configurations other than those shown in FIG. 4. For example, it is also possible to use only one optical marking device 300 that, for example, can be moved in such a way that light beams 301 can strike different positions of the tube bundle 2.

In particular, the optical marking devices 300 may be connected to a control device that controls the optical marking units 300 on the basis of the automatically calculated configuration of the tube bundle or heat exchanger.

Furthermore, the optical marking devices 300 can be combined, in particular during assembly of the webs 6, with the identification features 400 described above and illustrated in FIG. 3.

For example, the position at which an edge 60 of a web 6 is to be positioned can be marked by means of the light beam 301 as shown in FIG. 4, while the identification features 400 shown in FIG. 3 denote, for example, the tube layer 22 on which the web 6 is to be arranged along with the axial position of the web 6.

| LIST OF REFERENCE SIGNS | |
|---|---|
| 1 | Heat exchanger |
| 2 | Tube bundle |
| 3 | Skirt |
| 4 | First braid |
| 5 | Second braid |
| 6 | Web |
| 7 | Tube group |
| 10 | Shell |
| 11 | Winding region |
| 20 | Tube |
| 21 | Core tube |
| 22 | Tube layer |
| 23 | Winding |
| 24 | First position |
| 25 | First section |
| 26 | Second section |
| 27 | Second position |
| 28 | Third section |
| 29 | Fourth section |
| 101 | First inlet connection |
| 102 | First outlet connection |
| 103 | Second inlet connection |
| 104 | Tube bottom |
| 104a | First tube bottom |
| 104b | Second tube bottom |
| 105 | Second outlet connection |
| 106 | Hole |
| 200 | Display device |
| 201 | Screen |
| 210 | Communication device |
| 220 | Input device |
| 230 | Optical detection device |
| 300 | Optical marking device |
| 301 | Laser beam |
| 400 | Identification feature |
| 401 | First marking |
| 402 | Second marking |
| 403 | Third marking |
| 500 | Data processing unit |
| B | Helical path |
| L | Longitudinal axis |
| M | Shell space |

The invention claimed is:

1. A method for producing a wound heat exchanger, which has a core tube and a tube bundle, wherein the tube bundle has a plurality of tubes wound helically about the core tube for conducting a first fluid, said method comprising:

automatically calculating a course of the tubes of the tube bundle from a first tube bottom of the heat exchanger around the core tube to a second tube bottom of the heat exchanger, marking by means of a light beam at least one position at which a tube of said plurality of tubes runs according to the calculated course, and mounting said tube according to the marking by means of said light beam.

2. The method according to claim 1, further comprising marking a hole of the first tube bottom or the second tube bottom by means of the light beam, and wherein the tube is inserted into said hole during assembly.

3. The method according to claim 1, wherein the tubes of said plurality of tubes are guided from the first tube bottom in a first braid to a winding region of the tube bundle, and are guided from the winding region in a second braid to the second tube bottom, wherein the tubes of said plurality of tubes in the winding region are wound around the core tube in a plurality of windings.

4. The method according to claim 3, wherein a first position at a transition between the first braid and the winding region is marked by means of said light beam or a further light beam, and wherein a tube of said plurality of tubes runs at the first position according to the calculated course, and wherein a second position at a transition between the winding region and the second braid is marked by means of said light beam or said further light beam, wherein the tube of said plurality of tubes runs at the second position according to the calculated course, and wherein the tube of said plurality of tubes is helically wound around the core tube from the marked first position to the marked second position.

5. The method according to claim 1, wherein the tubes of the heat exchanger comprise a plurality of tube layers and said method further comprises automatically calculating a course of at least one web between two tube layers of the tubes of the heat exchanger, such that a distance between the two tube layers is formed by means of the at least one web, marking the calculated course of the at least one web by means of said light beam or a further light beam, and mounting the at least one web according to the marking of the calculated course of the at least one web.

6. The method according to claim 5, further comprising marking a calculated course of an edge of the at least one web on one of the two tube layers by means of said light beam or said further light beam, and wherein the at least one web is positioned on said one of the two tube layers in such a way that the edge runs along the light beam or said further light beam.

7. The method according to claim 5, wherein the at least one web has at least one identification feature selected on the basis of a calculated profile and said at least one identification feature characterizes a position of the at least one web and/or a position of at least one tube of said plurality of tubes in the heat exchanger, wherein the at least one web and/or the at least one tube of said plurality of tubes is mounted corresponding to the at least one identification feature.

8. The method according to claim 7, wherein the at least one identification feature comprises an identification number.

9. The method according to claim 8, wherein the at least one web is mounted in the heat exchanger in an order corresponding to the at least one identification number.

10. The method according to claim 7, wherein the at least one web is mounted parallel to a longitudinal axis of the heat exchanger along which the core tube extends, and wherein the at least one identification feature comprises an angular position of the at least one web, wherein the angular position indicates a position of the at least one web in a circumferential direction relative to an longitudinal axis of said heat exchanger.

11. The method according to claim 7, wherein the at least one identification feature of the at least one web comprises an indication of a tube layer of said plurality of tube layers on which the at least one web is to be positioned in the heat exchanger during assembly.

12. The method according to claim 7, wherein the at least one identification feature comprises a first marking that marks a first position or a second position, wherein at the first position, a first braid merges into a winding region according to the calculated course, and wherein at the second position, the winding region merges into the second position according to the calculated course.

13. The method according to claim 7, wherein the at least one identification feature comprises a plurality of second markings, wherein the tubes of said plurality of tubes are wound around the core tube such that the course of a winding of each tube of said plurality of tubes is marked by the second markings.

14. The method according to claim 13, wherein the second markings are each extended along a line, wherein each tube of said plurality of tubes is wound around the core tube in such a way that each tube runs in sections along said line.

15. The method according to claim 13, wherein the at least one identification feature further comprises at least one third marking, wherein the third marking indicates a position at which a clamp for fastening the tube to an adjacent tube of plurality of tubes is to be positioned.

16. The method according to claim 15, wherein the at least one identification feature further comprises at least one fourth marking, wherein the fourth marking indicates a cutting position at which a tube of the plurality of tubes is to be cut.

17. The method according to claim 7, further comprising displaying the at least one identification feature by means of an optical display device.

* * * * *